US006732011B1

(12) United States Patent
Hart, Jr. et al.

(10) Patent No.: US 6,732,011 B1
(45) Date of Patent: May 4, 2004

(54) APPARATUS FOR PREPARATION OF MAILPIECES AND METHOD FOR DOWNSTREAM CONTROL OF SUCH APPARATUS

(75) Inventors: William G. Hart, Jr., Sandy Hook, CT (US); Eugene Pritchard, Brookfield, CT (US); Michael Shea, Litchfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/411,080

(22) Filed: Oct. 4, 1999

(51) Int. Cl.[7] ................................................ G06F 7/00

(52) U.S. Cl. ....................... 700/223; 700/219; 700/220; 700/221; 700/224; 700/225; 700/226; 270/1.03; 270/58.06; 271/3.01; 271/3.03; 271/3.14; 271/3.15

(58) Field of Search ................................ 700/223, 220, 700/221, 222, 224, 225, 226, 227, 219; 270/1.02, 1.03, 56, 52.14, 52.29, 58.06, 58.26; 271/221, 270, 3.05, 3.01, 3.03, 3.14, 3.15

(56) References Cited

U.S. PATENT DOCUMENTS 3,484,100 A 12/1969 Sather et al. ............ 270/52.02
4,194,685 A 3/1980 Hill et al. .................. 235/375
4,381,447 A 4/1983 Horvath et al. ......... 250/223 R
4,429,217 A * 1/1984 Hill et al. .................. 235/380
4,734,865 A * 3/1988 Scullion et al. ............ 364/478
4,790,119 A 12/1988 McDaniels ................... 53/411
4,797,830 A 1/1989 Baggarly et al. ........... 705/406
4,800,505 A 1/1989 Axelrod et al.
4,987,547 A 1/1991 Rabindran et al. .......... 700/220
5,177,687 A 1/1993 Baggarly et al.
5,214,642 A * 5/1993 Kunimoto et al. ............ 370/82
5,220,770 A 6/1993 Szewczyk et al. ............ 53/493
5,317,654 A 5/1994 Perry et al. ................. 382/101
5,467,434 A 11/1995 Hower, Jr. et al. ........ 358/1.15
5,493,106 A 2/1996 Hunter ....................... 235/375
5,538,232 A 7/1996 Long
5,618,037 A 4/1997 Chang et al. .......... 271/258.02
5,659,481 A 8/1997 Qutub et al. ................ 700/219
5,710,874 A 1/1998 Bergen ...................... 358/1.16
5,730,299 A 3/1998 Helsley ...................... 209/584
5,768,132 A 6/1998 Cordery et al. ............. 705/410
5,798,930 A 8/1998 van Oosten ................. 700/213
5,816,715 A 10/1998 Harman et al. ............... 400/71
5,818,724 A * 10/1998 Brewster et al. ............ 700/220
5,826,869 A 10/1998 Nyffenegger et al. .... 270/52.02
5,873,073 A * 2/1999 Bresnan et al. ............. 705/410
6,119,051 A * 9/2000 Anderson et al. ........... 700/221
6,131,053 A * 10/2000 Nyffenegger et al. .... 270/52.02
6,173,274 B1 * 1/2001 Ryan, Jr. .................... 705/408
6,370,521 B1 * 4/2002 Pigos et al. .................... 707/2

FOREIGN PATENT DOCUMENTS

DE 198 11 131 A1 9/1999
WO WO96/31820 * 10/1996 ............. G06F/5/06

* cited by examiner

*Primary Examiner*—Donald P. Walsh
*Assistant Examiner*—J Shapiro
(74) *Attorney, Agent, or Firm*—Michael J. Cummings; Charles R. Malandra, Jr.; Angelo N. Chaclas

(57) ABSTRACT

A system, method and apparatus for preparing mailpieces. A inserter system for assembling mailpieces in a mailing job is controlled in accordance with mailpiece records in a corresponding mailing control file. The inserter system scans control inserts included in the mailpieces fed into the mailpiece accumulations at a downstream station to verify corresponding mailpiece records. Initially the inserter system reads an initial, dummy control insert to accesses the mailing control file to initialized the upstream stations of the inserter system.

12 Claims, 5 Drawing Sheets

APPARATUS FOR PREPARATION OF MAILPIECES AND METHOD FOR DOWNSTREAM CONTROL OF SUCH APPARATUS

RELATED APPLICATIONS

The present application shares common elements of disclosure with commonly assigned, co-pending U.S. application Ser. No.: 09/124,501; titled: System, Method and Apparatus for Preparation of Mailpieces; filed: Jul. 29, 1988.

BACKGROUND OF THE INVENTION

This invention relates to the preparation of large mailings and the like. More particularly it relates to systems and apparatus for the preparation of documents and the assembly of multiple mailpieces including such documents.

The term "mailpieces" as used herein means items intended to be delivered by a postal service or private courier service. Typically preparation of mailpieces includes, but is not limited to, printing or otherwise providing documents including variable information pertaining to addressees of the mailpieces and the assembly of such documents with other elements of the mailpiece. The term "assembly" as used herein means the execution of actions to incorporate the documents into mailpieces. Typically, such actions can include: accumulating documents with other materials such as preprinted inserts, folding and inserting the resulting accumulations into envelopes, printing addresses and other information on the outside of the envelopes, and franking the mailpiece with an appropriate postage amount.

Inserter systems for the assembly of mailpieces are well known. A typical inserter system is shown in FIG. 1. Inserter system 10 includes burster/feeder 12 which inputs preprinted documents in fanfold form, separates the documents and removes and discards sprocket feed strips FS from the edges of the document. Each group of documents for a particular mailpiece includes at least control document CD. On control documents CD strips FS are marked with code BC which is read by scanner 14 before strips FS are removed. In simpler systems code BC can be a "dash code" of the type known for use in directly controlling inserter systems. In newer, more complex systems code BC can be a conventional bar code which serves as a pointer to a mailpiece record which record contains information for controlling the inserter; as will be more fully described below. In other known inserter systems, the documents can be in cut sheet form and a cut sheet feeder can be used in place of burster/feeder 12.

Control document CD, and any additional associated pages are fed from burster feeder 12 to accumulator 16 where documents for each mailpiece are formed into separate accumulations A and folded.

Accumulation A is then fed to insert stations 20A and 20B where preprinted inserts I are added to form accumulations A1 and A2. Those skilled in the art will of course recognize that the number of such insert stations used will vary from application to application.

Accumulation A2 is then fed to insert station 22 where it is inserted into an envelope and sealed to form mailpiece MP.

Mailpiece MP is then fed to address printer 24 which prints address AD on the outside of the envelope. Depending on the size of the print field of printer 24, printer 24 also can be used to print other information such as a variable return address (or other text message) RA, logo L, and postal barcode PBC on the envelope. (Those skilled in the art will recognize that dash codes as described above typically cannot include sufficient information to define even address AD so that systems incorporating dash codes typically use window envelopes to provide addressing information.)

System 10 also includes out stacker 30 for diverting mailpieces when an error is detected.

As noted above, inserter systems wherein said code BC is a barcode which is used as a pointer to a mailpiece record (i.e. an electronic record associated with a mailpiece to be assembled) are known. By incorporating data for controlling assembly of mailpieces in mailpiece records an essentially unlimited amount of data can be associated with each mailpiece. Thus addresses, return addresses, logos, and postal bar codes can all be readily specified in addition to specification of the number of inserts to be added at each insert feeder, postage amounts, etc. Systems incorporating such mailpiece records are described in commonly assigned U.S. Pat. No. 4,800,505; to: Axelrod et al.; for: Mail Preparation System; issued Jan. 24, 1989, which is hereby incorporated by reference. Embodiments of the system of U.S. Pat. No. 4,800,505 are marketed by the assignee of the present application under the name "Direct Connection", described in The Direct Connection, version 1.30.

While systems such as those described above have proven highly successful certain disadvantages remain. In particular, in mailings where valuable or sensitive items such as credit cards are to be mailed it is important to assure that the item is correctly included and that the corresponding mailpiece is correctly addressed. To increase this level of assurance, credit cards or similar critical items can be affixed to the corresponding control document so that the card will always be accumulated into the correct mailpiece. However in prior file based systems, such as that described above, the control document is the first document to be accumulated and passes through each station of the system; thus increasing the chances that the card or critical item will be damaged or lost in case of a jam or other malfunction.

Thus it is an object of the subject invention to provide a system, apparatus and method for the preparation and assembly of mailpieces where control documents (hereinafter sometimes control inserts) are less likely to be lost or damaged.

BRIEF SUMMARY OF THE INVENTION

The above object is achieved and the disadvantages of the prior art are overcome in accordance with the subject invention by means of a system, apparatus and method for preparing mailpieces and the like. The system includes a data processing system programmed to generate a mailing job including a plurality of mailpieces, by outputting a mailing control file, the mailing control file including a plurality of mailpiece records, each of the records defining preparation of a corresponding mailpiece and producing at least an initial control insert, the control insert including data identifying the mailing control file; storing means for storing mailing control files, the mailing control files including a plurality of mailpiece records, each of the records defining preparation of a corresponding mailpiece; and apparatus for assembling the mailpieces.

The apparatus includes a mechanism for assembling the mailpieces, the assembling mechanism including a plurality of stations for accumulating documents or inserts into the mailpieces as accumulations of the documents or inserts move through the stations; a scanner, the scanner reading data from control inserts, the control inserts being included in the accumulated documents or inserts, the control inserts being accumulated into the mailpieces by a downstream one of the stations; and a controller. The controller is responsive to an element of the data read from an initial control insert to: access storing means for storing mailing control files, the mailing control files including a plurality of mailpiece records, each of the records defining preparation of a corresponding mailpiece, to open a mailing control file identified by the element; initialize the apparatus by forming accumulations in accordance with corresponding records in the opened file at each of the stations upstream of the downstream station; and thereafter sequentially process records in the opened file and controlling the apparatus to form a corresponding sequence of mailpieces.

The apparatus is controlled in accordance with the subject invention by carrying out the steps of: storing a mailing control file, the mailing control file including a plurality of mailpiece records, each of the records defining preparation of a corresponding mailpiece; reading data identifying the mailing control file from the initial control insert; and responding to the data read from the initial control insert to: open the mailing control file identified by the data; initialize the apparatus by forming accumulations in accordance with corresponding records in the opened file at each of the stations upstream of the downstream station; and thereafter sequentially process records in the opened file and control the apparatus to form a corresponding sequence of mailpieces.

In accordance with one aspect of the subject invention at least one of the mailpieces includes a control insert and item which is valuable or sensitive is affixed to the included control insert.

In accordance with another aspect of the subject invention the item is a credit card.

In accordance with another aspect of the subject invention the data is read from the initial control insert as the initial control insert is fed into an initial accumulation, which can be a dummy accumulation.

In accordance with still another aspect of the subject invention at least a plurality of the mailpieces include a control insert, the included control inserts including data identifying a corresponding record in the mailing control file, the included data being read to verify that the corresponding records have been used to control assembly of the plurality of the mailpieces.

Other objects and advantages of the subject invention will be apparent to those skilled in the art from consideration of the attached drawings and the detailed description set forth below.

DETAILED DESCRIPTION OF PREFERRED EMBODIMENTS OF THE SUBJECT INVENTION

Figure 1:
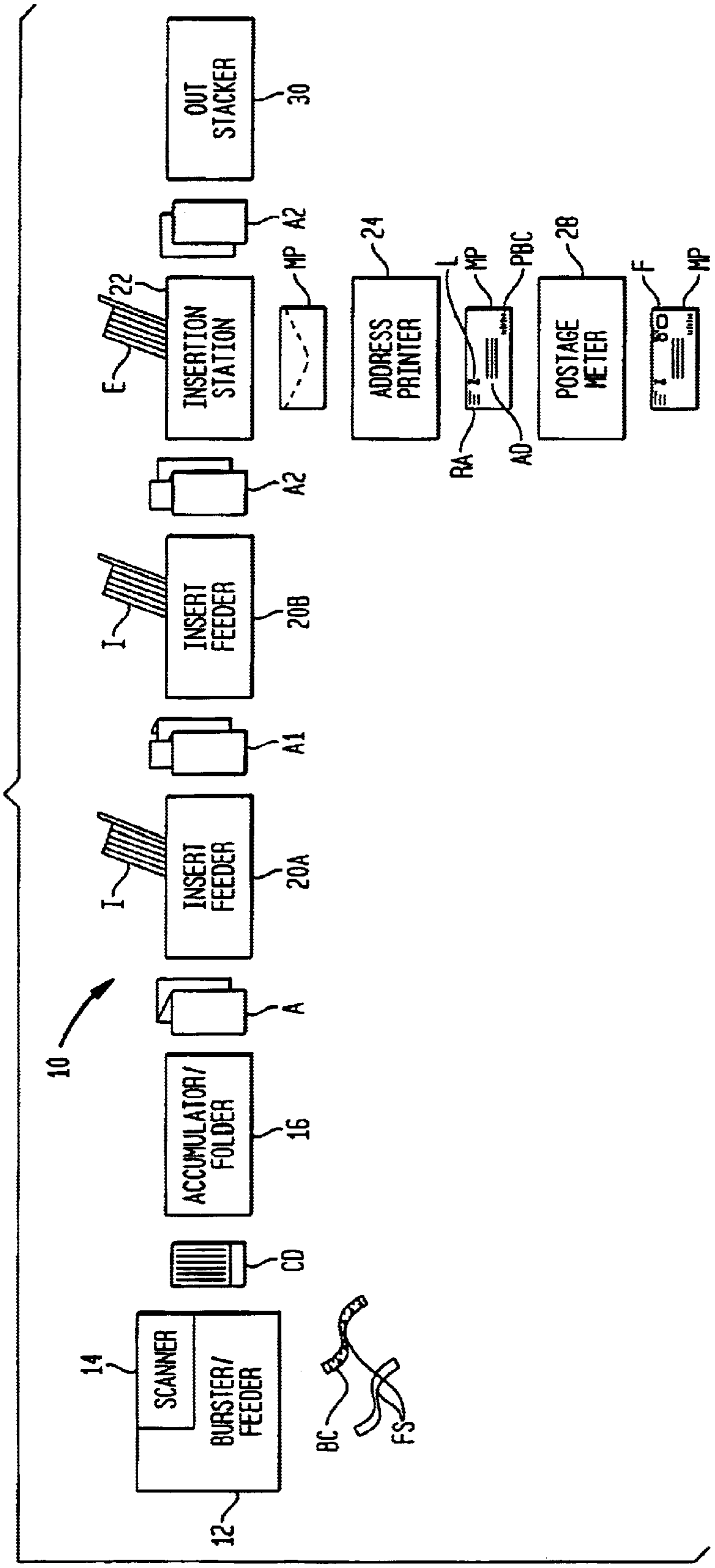
FIG. 1 (PRIOR ART)
FIG. 1 shows a schematic block diagram of a prior art inserter system.
Figure 3:
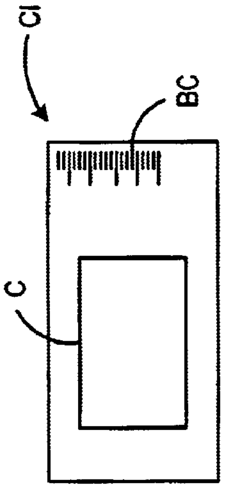
FIG. 3 shows a control insert in accordance with the subject invention.
Figure 2:
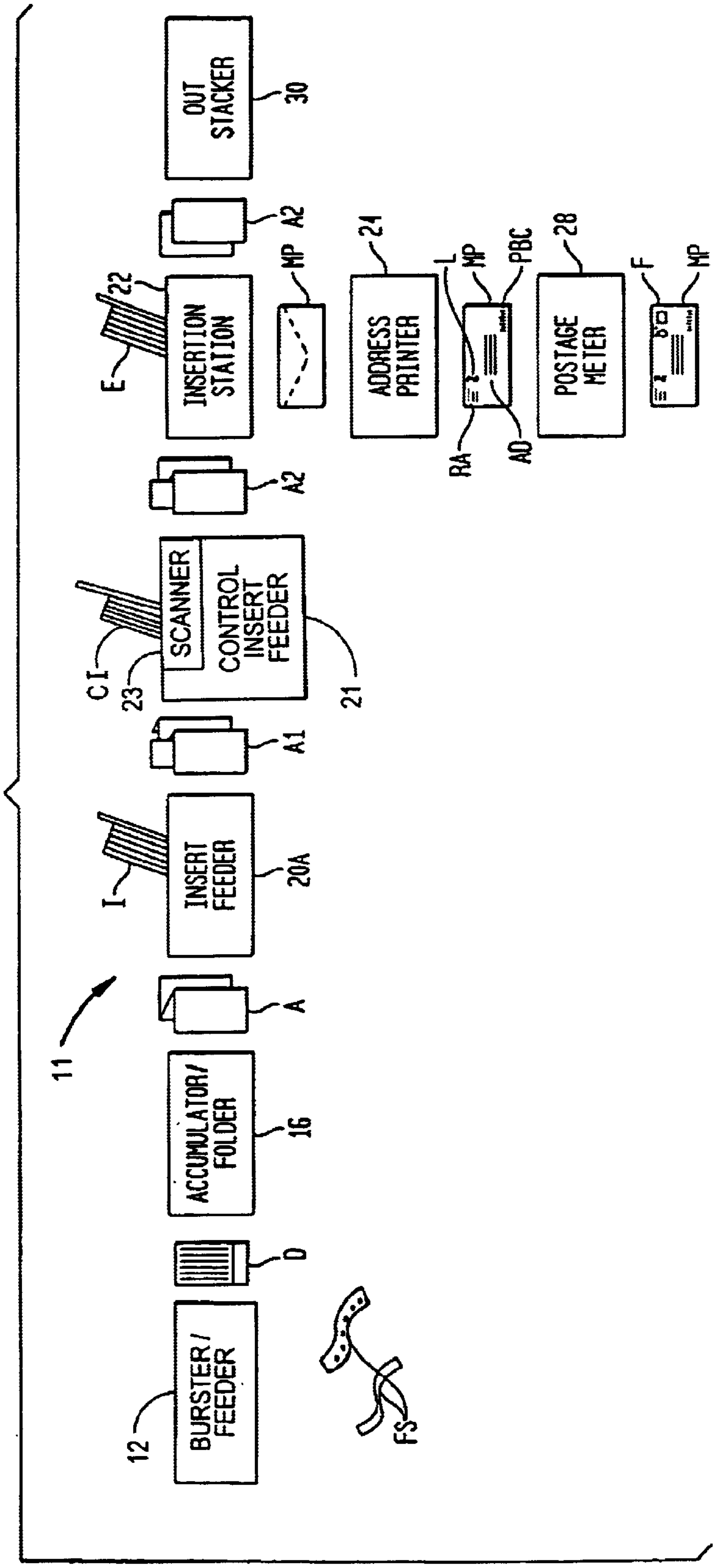
FIG. 2 shows a schematic block diagram of an inserter system in accordance with the subject invention.

FIG. 2 shows inserter system 11 in accordance with the subject invention which operates in the same manner as described above for the inserter system of FIG. 1 except that insert feeder 20B has been replaced with control insert feeder 21, which includes scanner 23. Scanner 23 reads code BC from control insert CI (shown in FIG. 3) as insert CI is fed to accumulation A1 by feeder 21. Feeder 21 is preferably located immediately upstream of inserter station 22 to minimize the chance that credit card C, which is affixed to insert CI in any convenient manner, will be lost or damaged in the case of a jam or other problem. Control insert feeder 21 can, however, be located at any convenient downstream location above inserter station 22.

Figure 4:
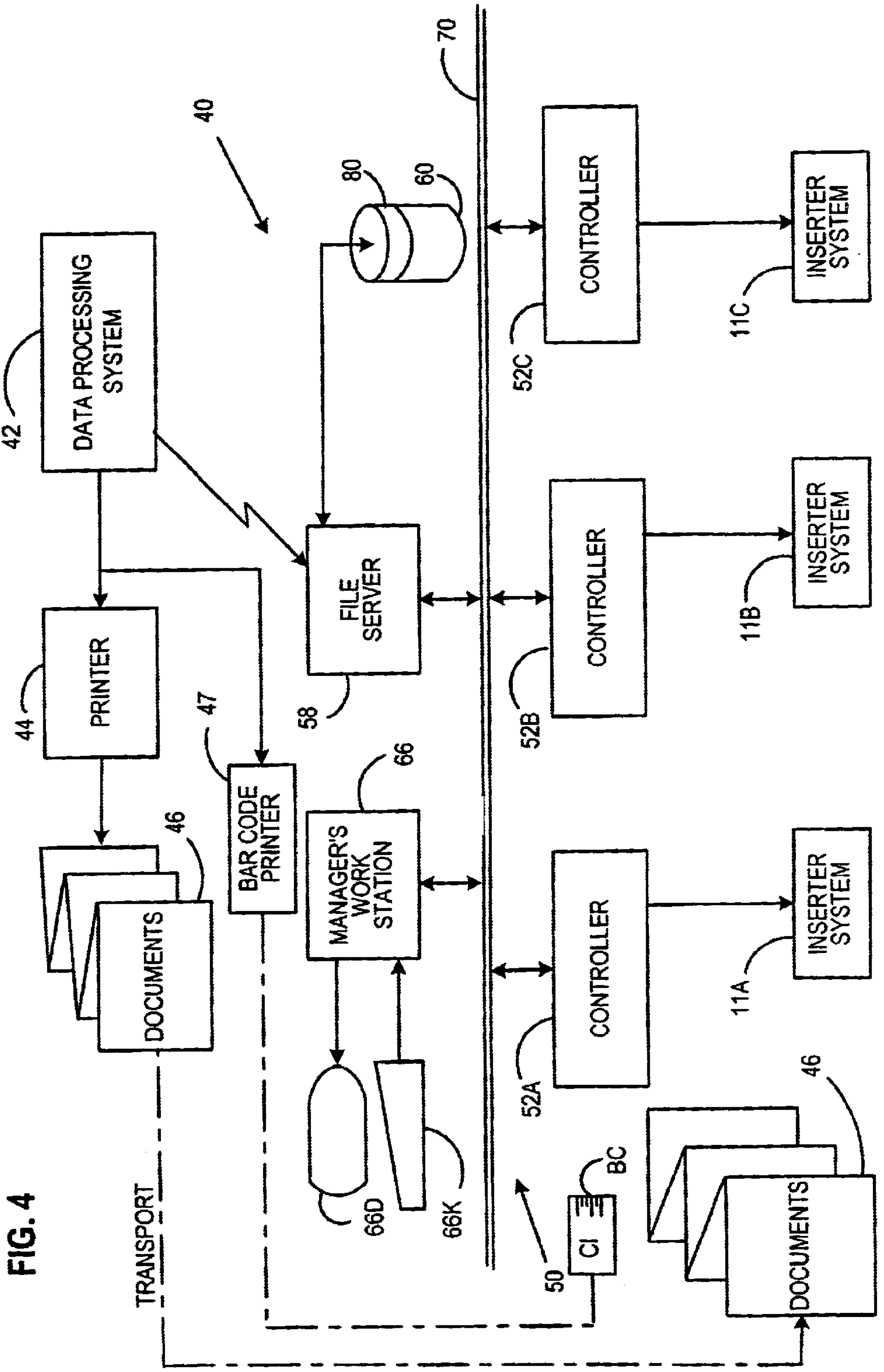
FIG. 4 shows a schematic block diagram of a system for preparing mailpieces.

FIG. 4 shows mail preparation system 40 which includes data processing system 42 and mailpiece assembly system 50.

Data processing system 42 is programmed in a conventional manner to generate documents 46. In the embodiment shown, system 42 controls printer 44 to print documents 46 directly and documents 46 are transported physically for assembly; however, any convenient method of output ant transport, such as electronic output and transmission for remote printing, can be used and is within the contemplation of the subject invention. Further, since control of mailpiece assembly is provided through a control insert, as will be described further below, in other embodiments documents 46 can be generated by other sources in any convenient manner or can be eliminated entirely. The embodiment shown is preferred however since correspondence between documents 46 and control inserts CI can most easily be controlled.

Data processing system 42 also controls bar code printer 47 which prints an appropriate bar code onto control inserts which have been, or will thereafter be, associated with a credit card or other critical item. The particular manner in which this association is made is not critical to the subject invention so long as the correspondence between credit card, control insert and mailing control file is accurately maintained.

Data processing system 42 also generates and outputs mailing control file 80, which includes a plurality of records; each record defining a mailpiece to be assembled as part of the corresponding mailing. Use of such files for controlling inserter systems is known and need not be discussed further here for an understanding of the subject invention. A more detailed description of such files is provided in the above referenced U.S. patent application Ser. No.: 09/124/501, entitled System, Method and Apparatus for Preparation of Mailpieces, filed Jul. 29, 1988; which is hereby incorporated by reference.

The mailing control file is communicated to mailpiece assembly system 50 through communications link 48, which can utilize any convenient form of communication, such as electronic data communication or the physical transfer of media without departing from the scope the subject invention.

In the embodiment shown in FIG. 4, mailpiece assembly system 50 includes inserter systems 11A, 11B, and 11C, which are substantially similar to inserter system 11 described above with reference to FIG. 2. In other embodiments different types of inserter systems having expanded (e.g. more insert modules ) or different functions (e.g. matched mail generation or address verification), but still including barcode pointers, can be used without departing from the scope of the subject invention.

Mailpiece assembly system 50 also includes controllers 52A, 52B, and 52C for controlling operation of inserter systems 11A, 11B, and 11C in a manner which will be described more fully below.

Mailpiece assembly system also includes file server 58 which manages mailing control file database 60 which stores file 80 and other mailing control files downloaded from data processing system 42, and which also communicate appropriate mailing control files to controllers 52A, B or C as mailings are assigned to inserter systems, as will be more fully described below.

Mailpiece assembly system also includes manager's workstation 66, which includes display 66D and keyboard 66K through which a site manager can provide operational management input such as accessing and editing database 60 or assigning mailings to various inserter systems.

Communications among workstation 66, file server 58 and controllers 52A, B and C is preferably carried out over a conventional local area network in a manner well understood by those skilled in the art and which need not be discussed further for an understanding of the subject invention.

Figure 5:
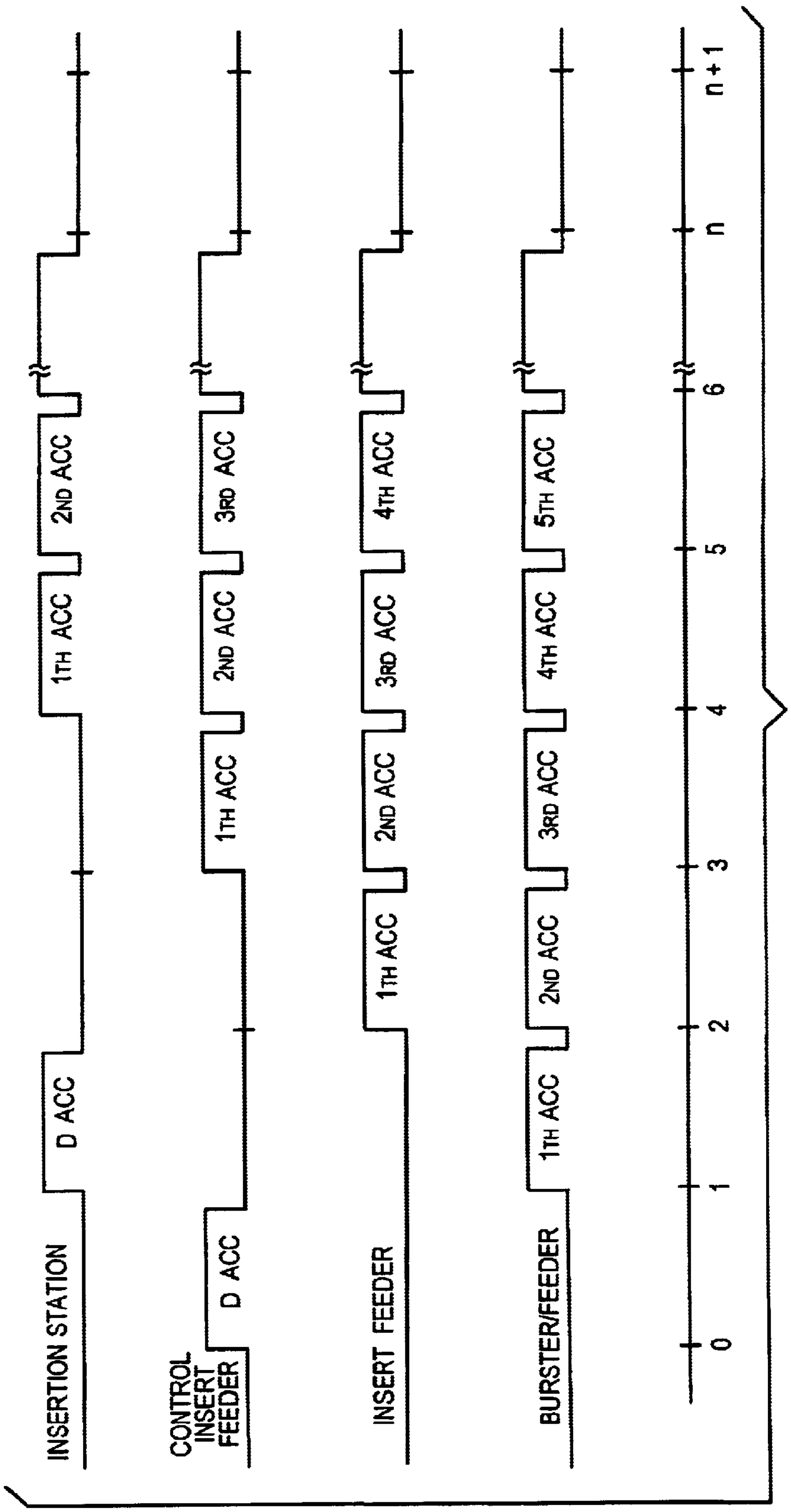
FIG. 5 shows a timing diagram of the operation of the apparatus of FIG. 2.

Turning to FIG. 5, a timing diagram of the operation of the inserter system of FIG. 2 is shown. As is known, inserter systems such as that shown in FIG. 2 operate in a synchronous, "lock-step" manner where each accumulation in process advances to the next downstream station at the end of a cycle.

In FIG. 5, during cycle 0, control insert feeder feeds an initial control insert which is scanned by scanner 23 as it is fed. The data scanned from the initial control document is used by inserter system controller 52A (for clarity it will be assumed that the mailing is processed by inserter system 11A) to access the mailing control file for the mailing to be run, as will be described further below. The initial control insert is not combined with any other inserts or documents and forms an initial accumulation, which is preferably a dummy accumulation which is fed to outstacker 30.

During cycle 1, which is the first cycle of the actual mailing the dummy accumulation is fed to the insert station and preferably thereafter outstacked, and burster/feeder 12 feeds documents, if any are required, into the first accumulation, corresponding to the first record in the mailing control file.

During cycle 2 all accumulations are advanced and burster/feeder 12 feeds documents into the second accumulation, corresponding to the second record in the mailing control file, while insert feeder 20A feeds an insert, if any are required, into the first accumulation. After cycle 2-inser system 11 is initialized; that is accumulations have been advanced sequentially through all stations upstream from control insert feeder 21.

During cycle 3 during cycle 3 control insert feeder 21 feeds the first control insert in to the first accumulation, insert feeder 20A feeds the next insert into the second accumulation and burster feeder 12 feeds documents to the third accumulation, corresponding to the third record in the mailing control file.

During cycle 4 the first accumulation is inserted into an envelope at insertion station 22 and is thereafter processed in a conventional manner which need not be described further here for an understanding of the subject invention. Control insert feeder 21 feeds the second control insert into the second accumulation, insert feeder 20A feeds the next insert into the third accumulation, an burster/feeder 12 feeds documents into the fourth accumulation, corresponding to the fourth record in the mailing control file.

During cycle 5, and thereafter further records are accessed in order and the corresponding accumulations are processed in sequence through inserter system 11 until the mailing is completed. This processing is well known and need not be discussed further here for an understanding of the subject invention.

It should be noted that the use of an initial control insert to form an initial, dummy accumulation which does not contain documents or inserts from upstream stations is preferred because of the desire to use current inserter system scanner technology which cannot read codes before the control insert is fed into an accumulation, and because the lock-step nature of the operation of inserter systems prevents holding an accumulation at a station once the accumulation is formed. However, it is well within the ability of those skilled in the inserter art to use other known scanner technology, or to provide a holding station at control insert feeder 21, to provide the capability to read control inserts before they are fed to an accumulation. This would permit reading the control insert corresponding to the first record prior to the first cycle to identify the mailing control file, and allow elimination of the initial control insert and dummy accumulation without modification to the remaining operation of insert system 11 as shown in FIG. 5.

It should also be noted that though the preferred embodiment described above incorporates an insert feeder, a burster/feeder and accumulator, or any other suitable mechanism for feeding items having a bar code into an accumulation could be used in place of the an insert type feeder without departing from the scope of the invention. Accordingly it should be understood that the term "control insert" is intended to include any item which includes a bar code and which is intended to be inserted into an accumulation at a downstream station.

Figure 6:
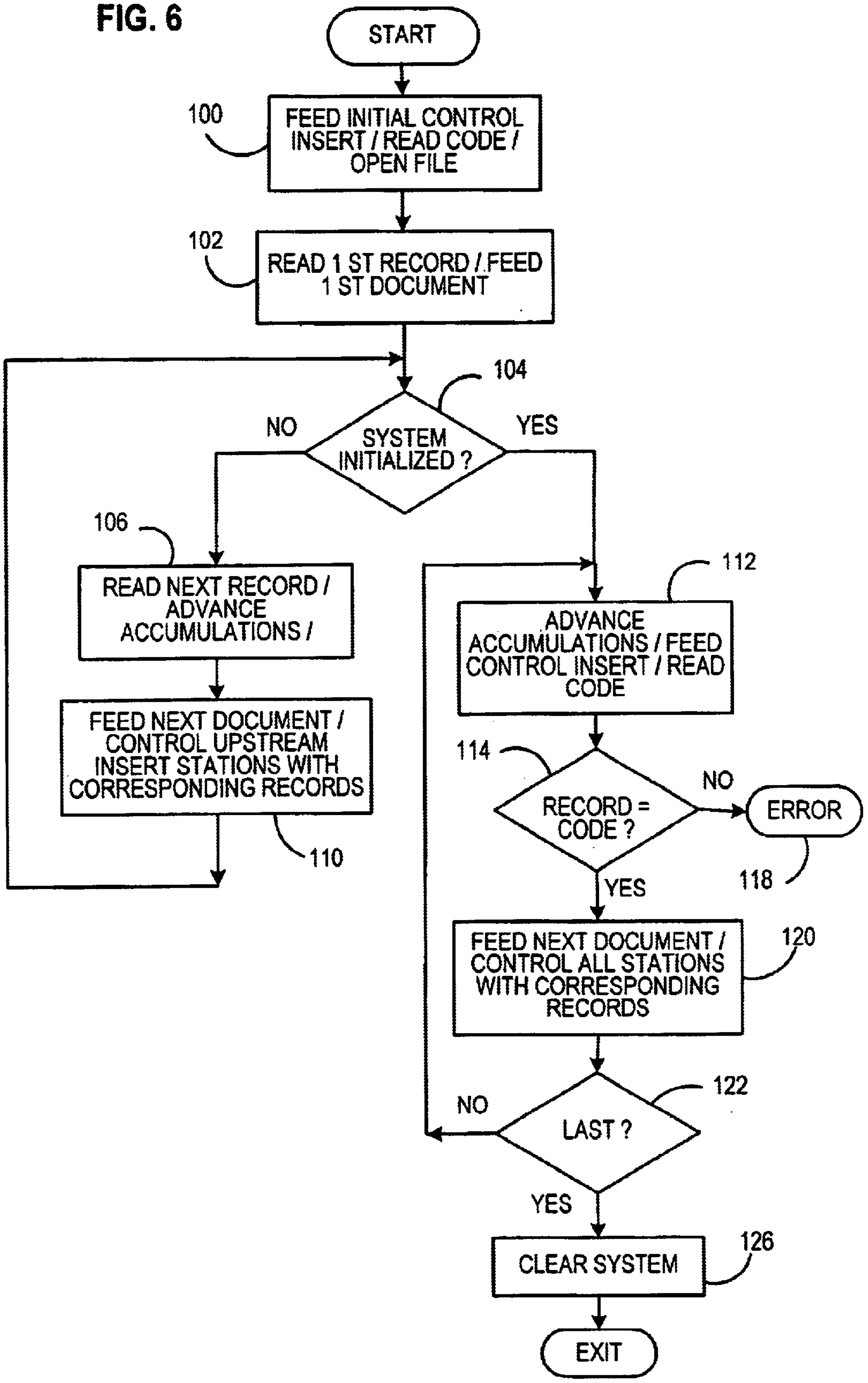
FIG. 6 shows a flow diagram of the operation of the apparatus of FIG. 2.

Turning to FIG. 6, a flow diagram of the operation of controller 52A in controlling insert system 11A in accordance with the subject invention is shown. At 100 controller 52A controls control insert feeder 21 to feed the initial control insert and controls scanner 23 to read code BC, and then opens the mailing control file identified by that code. At 102 controller 52a reads the first record in the file and controls burster/feeder 12 and accumulator 16 to feed any documents required into the first accumulation. At 104 controller 52A tests to determine if inserter system 11 is initialized; that is if accumulations have been sequenced though all upstream stations.

If not, then at 106 controller 52A reads the next record in sequence in the file and advances all accumulations in process. Then at 110 it controls burster/feeder 12 and accumulator 16 to feed the next document set into the next accumulation and controls all upstream insert stations, in the preferred embodiment insert feeder 20A, to feed inserts, as described above with respect to FIG. 5.

Controller 52A then continues to loop through 104 until inserter system 11A is initialized. Then at 112 it advances all accumulations and controls control insert feeder 21 to feed the next control insert, which should correspond to the record in process at control insert feeder 21, into the accumulation in process and reads code BC from the first control insert. Then at 114 it tests to determine if the record identified by code BC is the record in process and, if not, exits to an error routine at 118. Details of this routine form no part of the subject invention per se and need not be described further. Then at 120 controller 52A controls burster/feeder 12 and accumulator 16 to feed the next document set and controls all stations in accordance with the corresponding records, as described above with respect to FIG. 5.

Control of various stations of insert system 11A in accordance with corresponding mailing control file records is substantially conventional and easily within the skill of a person skilled in the inserter art.

Then at 120 controller 52A tests to determine if this is the last record/mailpiece and if not returns to 112. Otherwise at 126 it continues to control inserter system 11A in a conventional manner until the last mailpiece is processed.

The embodiments described above and illustrated in the attached drawings have been given by way of example and illustration only from the teachings of the present application those skilled in the art will readily recognize numerous other embodiments in accordance with the subject invention. Accordingly, limitations on the subject invention are to be found only in the claims set forth below.

What is claimed is:

1. Apparatus for assembling mailpieces, said apparatus comprising:

a) means for assembling said mailpieces, said assembling means including a plurality of stations for accumulating documents or inserts into said mailpieces as accumulations of said documents or inserts move through said stations, said plurality of stations including at least one upstream station and a control insert feeder located downstream of the upstream station, the control insert feeder feeding control inserts for inclusion in accumulations processed by the upstream station; and b) a scanner proximal to the control insert feeder, said scanner reading data from control inserts fed by the control insert feeder, said control inserts being included in said accumulated documents or inserts; and c) a controller, responsive to an element of said data read from an initial control insert to:

c1) access storing means for storing mailing control files, said mailing control files comprising a plurality of mailpiece records, each of said records defining preparation of a corresponding mailpiece, to open a mailing control file identified by said element;

c2) initialize said apparatus by forming accumulations in accordance with corresponding records in said opened file at each of said stations upstream of said control insert feeder station; and c3) thereafter sequentially process records in said opened file and controlling said apparatus to form a corresponding sequence of mailpieces.

2. Apparatus as described in claim 1 wherein at least one of said control inserts includes an item which is valuable or sensitive affixed thereto.

3. Apparatus as described in claim 2 wherein said item is a credit card.

4. Apparatus as described in claim 1 wherein said data is read from said initial control insert as said initial control insert is fed into an initial accumulation.

5. Apparatus as described in claim 4 wherein said initial accumulation is a dummy accumulation.

6. Apparatus as described in claim 1 wherein at least a plurality of said mailpieces include a control insert, said included control inserts including data identifying a corresponding record in said mailing control file, said included data being read to verify that said corresponding records have been used to control assembly of said plurality of said mailpieces.

7. A system for preparing mailpieces, said system comprising:

a) a data processing system programmed to generate a mailing job comprising a plurality of mailpieces, by;

a1) outputting a mailing control file, said mailing control file comprising a plurality of mailpiece records, each of said records defining preparation of a corresponding mailpiece;

a2) producing at least an initial control insert, said control inset including data identifying said mailing control file;

b) storing means for receiving and storing said mailing control files, said mailing control files comprising a plurality of mailpiece records, each of said records defining preparation of a corresponding mailpiece;

c) means for assembling said mailpieces, said assembling means including a plurality of stations for accumulating documents or inserts into said mailpieces as accumulations of said documents or inserts move through said stations, said plurality of stations including at least one upstream station and a control insert feeder located downstream of the upstream station, the control insert feeder feeding the initial control insert into an initial one of said accumulations; and d) a scanner proximal to said control insert feeder, said scanner reading data from said initial control insert;

e) a controller, responsive to said data read from said initial control insert to:

e1) access said storing means to open said mailing control file identified by said data;

e2) initialize said apparatus by forming accumulations in accordance with corresponding records in said opened file at each of said stations upstream of said control insert feeder station; and e3) thereafter sequentially processing records in said opened file and controlling said apparatus to form a corresponding sequence of mailpieces.

8. A system as described in claim 7 wherein at least one of said mailpieces includes a control insert and an item which is valuable or sensitive is affixed to said included control insert.

9. A system as described in claim 8 wherein said item is a credit card.

10. A system as described in claim 7 wherein said data is read from said initial control insert as said initial control insert is fed into an initial accumulation.

11. A system as described in claim 10 wherein said initial accumulation is a dummy accumulation.

12. A system as described in claim 7 wherein at least a plurality of said mailpieces include a control insert, said included control inserts including data identifying a corresponding record in said mailing control file, said included data being read to verify that said corresponding records have been used to control assembly of said plurality of said mailpieces.

* * * * *